United States Patent [19]
Fehr et al.

[11] 3,974,408
[45] Aug. 10, 1976

[54] ASYNCHRONOUS SYNCHRONIZABLE MAGNETIC COUPLING

[75] Inventors: Henri Fehr, Montmorency, France; Raymond Lucien Carriere, deceased, late of Paris, France, by Jeanne Constance Carriere, heiress and legal representative

[73] Assignee: Compagnie de Construction Mécanique Sulzer, Paris, France

[22] Filed: Jan. 20, 1975

[21] Appl. No.: 542,498

[30] Foreign Application Priority Data
Jan. 22, 1974  Switzerland............................ 798/74

[52] U.S. Cl. ................................. 310/103; 310/165
[51] Int. Cl.² ....................................... H02K 49/06
[58] Field of Search ............................. 310/92–111

[56] References Cited
UNITED STATES PATENTS

| | | | |
|---|---|---|---|
| 2,330,991 | 10/1943 | Newton | 310/105 X |
| 2,488,827 | 11/1949 | Pensabene | 310/105 |
| 2,939,023 | 5/1960 | Fehr | 310/105 |
| 2,951,956 | 9/1960 | Fehr | 310/103 X |
| 3,113,229 | 12/1963 | Jacobs | 310/105 |
| 3,238,402 | 3/1966 | Fehn | 310/105 |
| 3,700,941 | 10/1972 | Duncan | 310/105 |

*Primary Examiner*—Donovan F. Duggan
*Attorney, Agent, or Firm*—Kenyon & Kenyon Reilly Carr & Chapin

[57] ABSTRACT

The coupling is constructed for synchronous as well as asynchronous operation. To this end, the driving rotor and driven rotor are each provided with tooth-like poles and the poles of one rotor are spaced apart to cover only a part of the rotational surface of the rotor. The remaining part of the rotational surface is covered by smooth electrically-conductive layers. A circumferential band may also be disposed about or within a rotor in facing relation to the poles of the other rotor while being of smaller width than the air gap between the two rotors. For increased asynchronous operation, conductor rods are disposed between the poles of the rotors.

12 Claims, 5 Drawing Figures

ASYNCHRONOUS SYNCHRONIZABLE MAGNETIC COUPLING

This invention relates to an asynchronous synchronizable magnetic coupling for the transmission of a torque.

Magnetic couplings for the transmission of a torque have been known which are assembled with at least one excitation winding or one permanent magnet or a number of permanent magnets to induce a rotary-symmetrical magnetic field and with a driving and a driven rotor, mounted coaxially near one another so as to be able to turn about the axis of a rotary-symmetrical air-gap. These rotors are made, at least in part, of a material with good magnetic permeability.

In the case of rotary couplings we distinguish between the following two types of construction:
1. Synchronous couplings, whose driving and driven rotors normally turn at the same angular speed. When a torque is to be transmitted, the poles of the driven rotor follow those of the driving rotor, with an angle of lag whose magnitude depends on the size of the load transmitted. If slip occurs (i.e. a relative movement between the two rotors), in other words a condition outside synchronous operation, then the torques which can be transmitted by such a coupling are very small.
2. Asynchronous couplings are able, on the contrary, to transmit a torque only when their two rotors turn with different angular speed. These couplings have a transmission characteristic in which the torque is a function of the slip, and which, near zero slip, runs approximately proportionally.

There is already known an asynchronous synchronizable coupling for transmitting a rotary movement, whose torque as a function of the slip has the characteristics of both the aforesaid types of couplings. With a rotating driving rotor and an initially stationary driven rotor, a great starting-up torque occurs at a switch-on of the excitation current. This torque places the driven rotor into rotation, and accelerates the rotor up to the rotary speed of the driving rotor, after which the two rotors continue to run similarly, i.e. in synchronous operation. With this known coupling, one of the two rotors has two rings of magnetizable material, immovably connected mechanically together, and separated from one another by a non-magnetizable insert. Each of the two rings has a number of toothlike poles round the periphery, whose angular pitch and cross-section differ. The teeth having the greatest angular pitch are moved, relative to the annular layer of electrically-conductive material fastened to the other rotor. Thus, the coupling is able to transmit an asynchronous torque. The teeth of the smaller pitch angle in their turn, in the case of a standstill or similar running of the two rotors, are in each case opposite the teeth of a toothed ring of the same pitch fastened to the other rotor and transmit a synchronous torque.

Briefly, this invention is directed to an asynchronous synchronizable magnetic coupling for the transmission of synchronous and asynchronous torques. The coupling includes a means defining a stationary axially-symmetrical air gap, a driving rotor having a magnetizable ring within the air gap and including a surface facing the gap, a driven rotor coaxially mounted relative to the driving rotor and having a magnetizable ring within the air gap and having a surface facing the driving rotor ring surface to define a partial air gap, and a means for producing a magnetic field passing through the stationary air gap and the ring surfaces. The rotors are mounted to rotate about an axis of symmetry of the air gap. In addition, a plurality of tooth-like poles are mounted on each of the rotor ring surfaces in facing relation to the other rotor ring surface. The poles are disposed at the same angular spacing on each rotor.

In accordance with the invention, the tooth-like poles of at least one of the two rotor rings are disposed on only a part of the ring surface and the remainder of the rotary surface is covered with at least one smooth non-magnetizable electrically-conductive layer.

In one embodiment, wherein the rotor rings are concentrically mounted, at least one annular electrically-conductive smooth strip is disposed at the periphery of one of the rotor rings. This strip is of a width which corresponds to a fraction of the width of the partial air-gap between the two rotor rings.

In another embodiment, the tooth-like poles of one of the rotor rings are distributed groupwise and at regular spacings over the rotor periphery, and the rotary surface between the pole-groups is covered by a smooth electrically-conductive layer which extends to the height of the poles.

In these latter two embodiments, the ratio of the surface areas between the parts of the rotary surfaces covered by electrically-conductive strips or layers and the parts having tooth-like poles can be selected in accordance with the ratio between the maximum synchronous torque ($C_s$max) and the maximum asynchronous torque ($C_a$ max) that the coupling has to transmit.

In another embodiment, in order to transmit greater synchronous and asynchronous torques, at least one of the rotor rings may have the tooth-like poles distributed uniformly over the entire circumference of the partial air-gap existing between the two rings.

When the poles of the one rotor ring have the same angular pitch as those of the other rotor ring but are of a pole width, as measured in the peripheral direction, which varies from that of the poles of the second ring, then another, for example, flatter graph of the synchronous torque may be obtained at a small angle of rotary displacement between the two rotors.

In order to increase the torque transmitted with asynchronous running, solid or tubular conductor rods may be inserted between the tooth-like poles of at least one of the two rotor rings. When the ends of these conductor rods are connected with one another by short-circuit means such as segments or short-circuit rings, they form a sort of cage-armature, as is known for asynchronous motors.

In general, the means defining the stationary air gap includes a magnet core and a cylindrical element which together with a cover define a stator housing. In this construction, partial air-gaps are situated between the stator and the rotor rings and in order to increase the efficiency of the coupling these partial air gaps are defined by rotational surfaces, which are made coaxial and smooth. This arrangement reinforces the coupling between the two rotors, in that the resistance of the magnetic circuit is decreased.

When the air-gaps between the stator and the rotor rings, as well as between the two rotor rings are of substantially cylindrical form, and the two rotor rings are set concentrically, i.e. one inside the other, then the axial and radial forces that may otherwise appear between the mobile parts are completely eliminated.

One particularly simple form of construction results when the means to provide the magnetic field is an excitation winding or permanent magnet which is stationary, and fastened to the stator or the housing of the coupling.

These and other objects and advantages of the invention will become more apparent from the following detailed description and appended claims taken in conjunction with the accompanying drawings in which:

Figure 1:
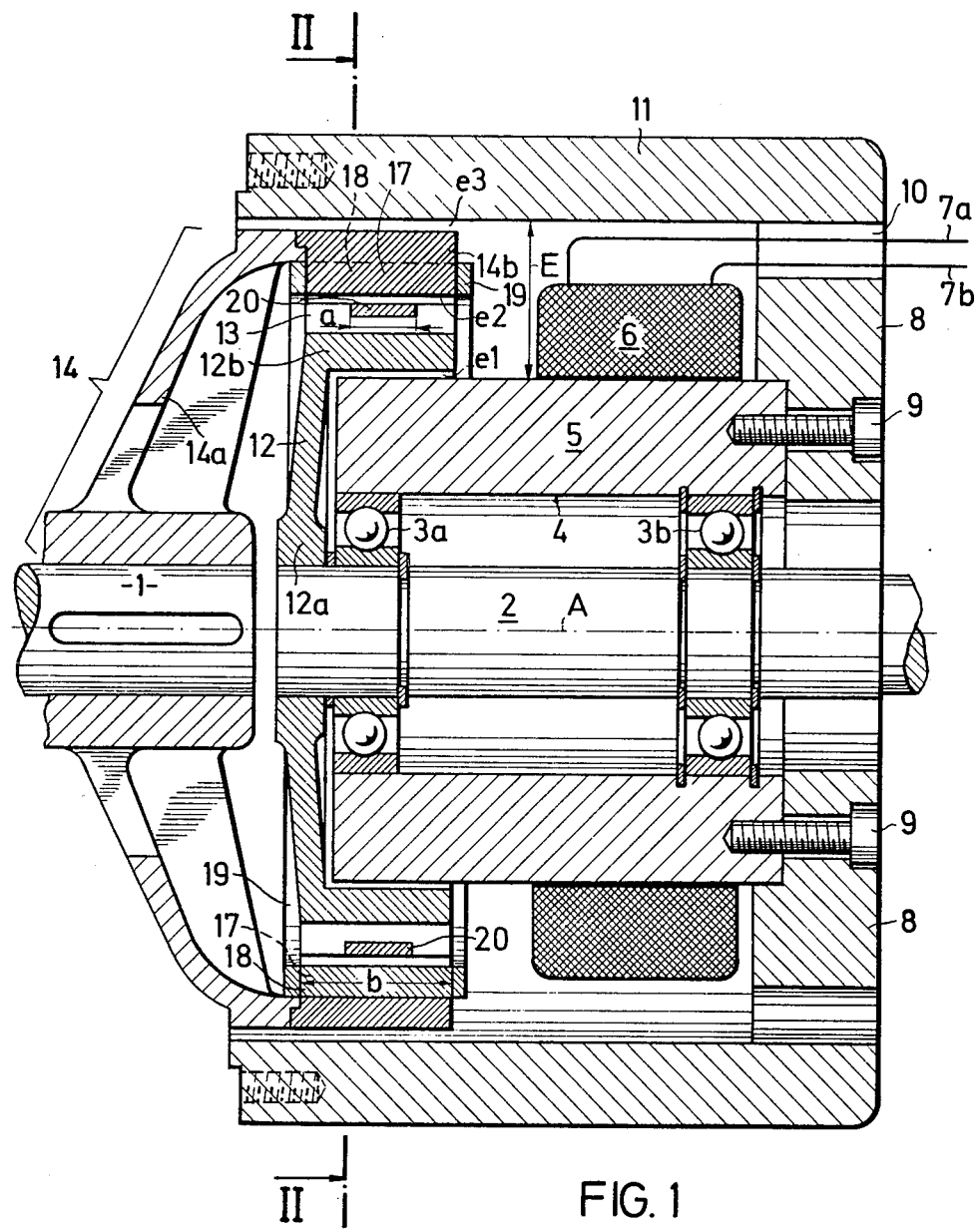
FIG. 1 illustrates a part cross-sectional view of a coupling of the invention in a plane going through the axis of symmetry.
Figure 2:
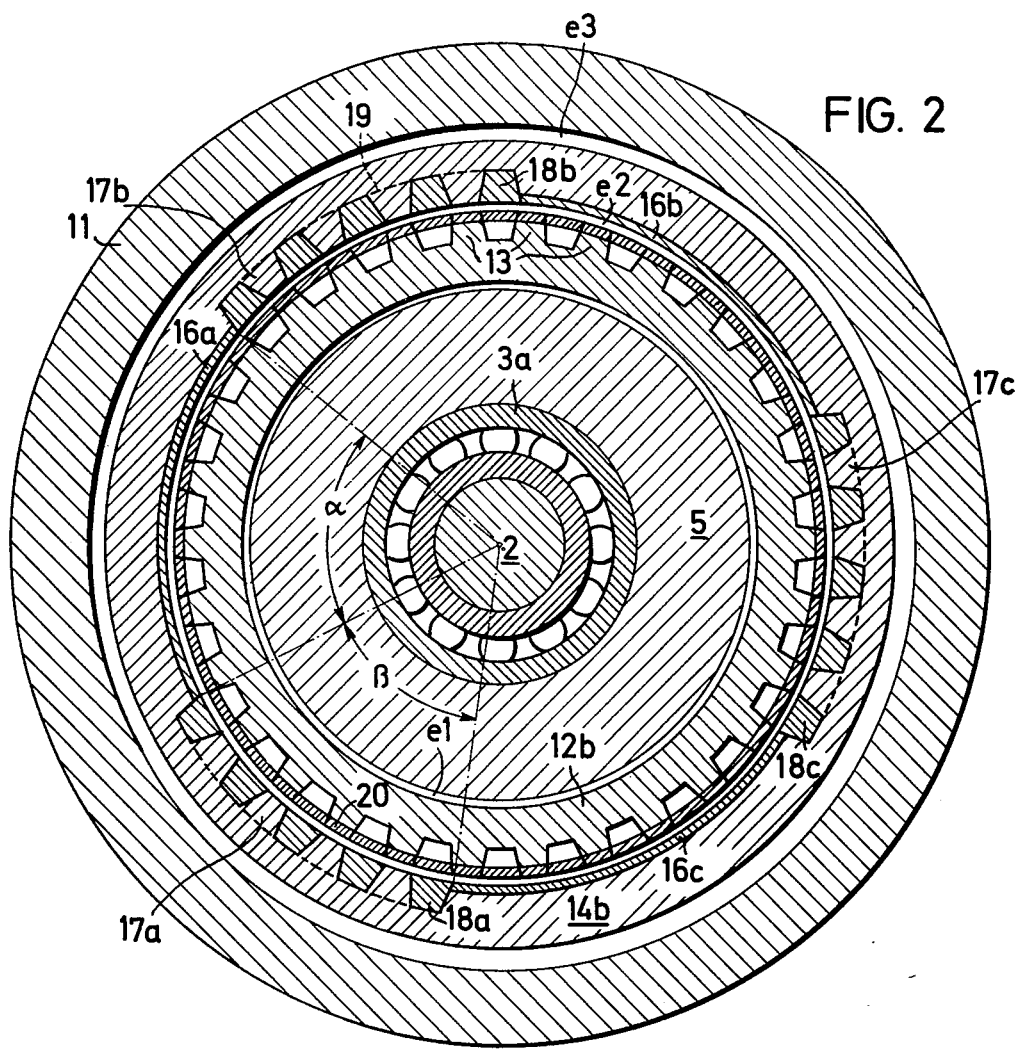
FIG. 2 illustrates a view taken on line II—II of FIG. 1.
Figure 4:
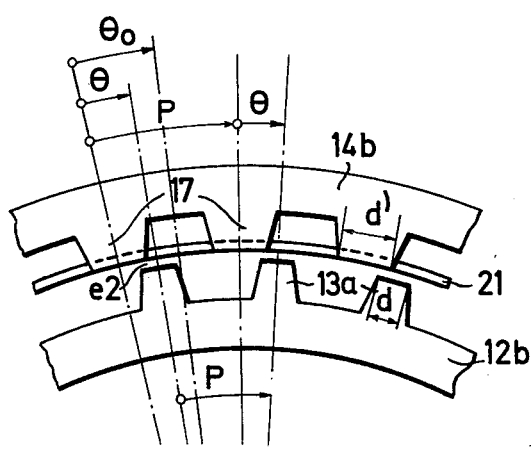
Figure 3:
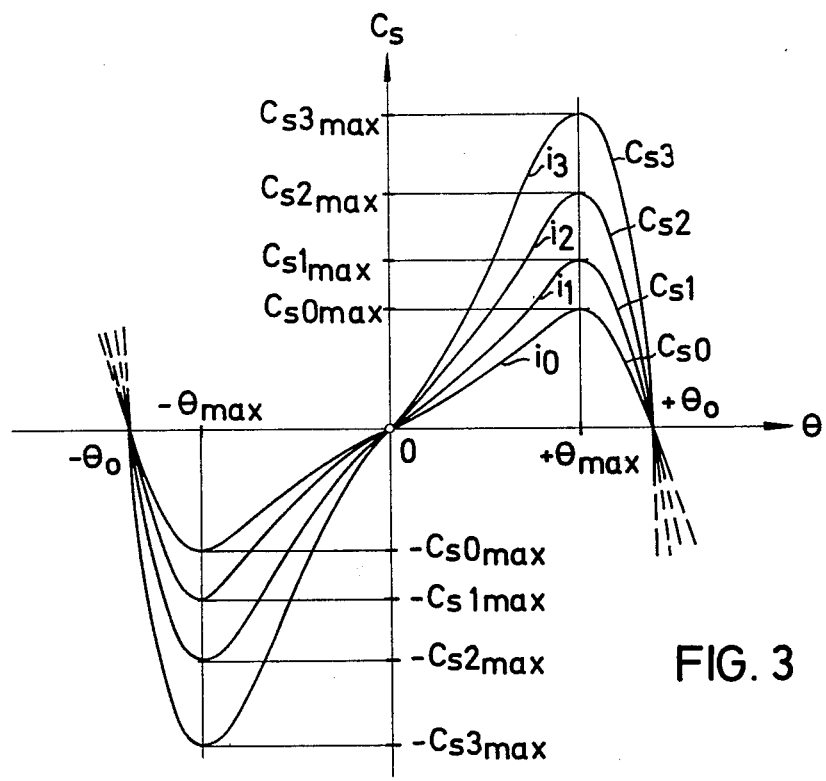

FIG. 3 graphically illustrates the operation of the coupling of FIG. 1;

FIG. 4 illustrates to a larger scale a detail of FIG. 2; and

Figure 5:
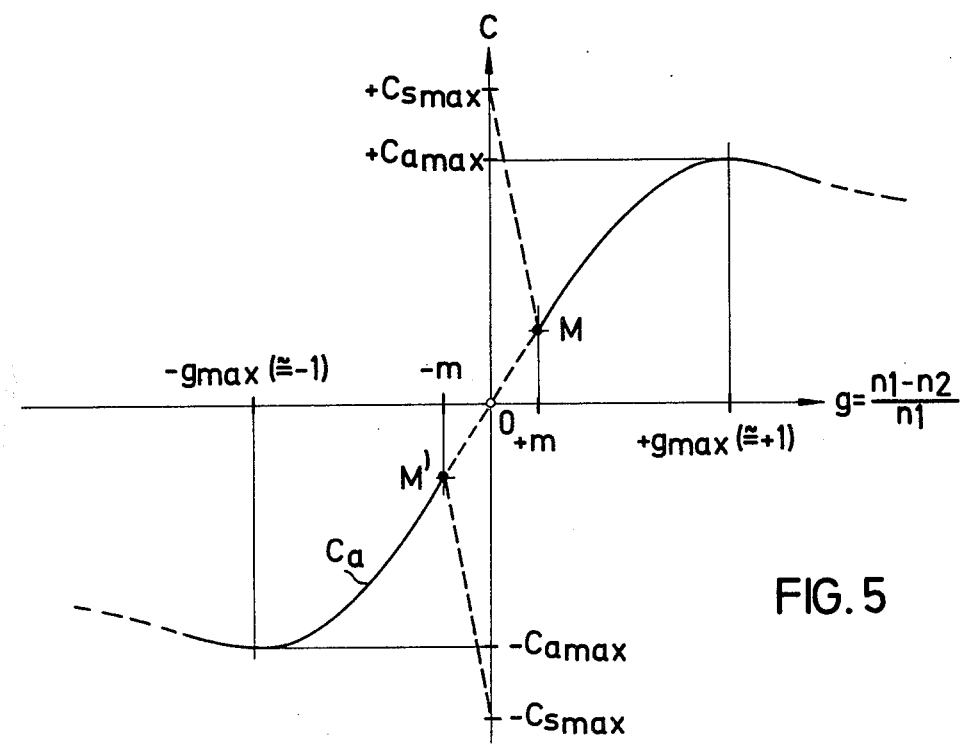

FIG. 5 graphically illustrates a mode of operation of the coupling of FIG. 1.

Referring to FIGS. 1 and 2, the coupling has a driving shaft 1 and a driven stub-shaft 2 set coaxially in an extension of the driving shaft 1. The driven shaft 2 is mounted to rotate freely via two ball-bearings 3a, 3b in a cylindrical bore 4 of a magnet core 5, which is likewise cylindrical and disposed symmetrically of the common axis A. An electric torus-shaped excitation winding 6 is secured at the right-hand end of the magnet core 5 as viewed in FIG. 1. The winding 6 is supplied via connecting wires 7a, 7b with a suitable excitation current, in particular a rectified AC or a DC. The magnet core 5 with the winding 6 is complemented by a housing, consisting essentially of an annular part 8 fastened to the right-hand end of the core 5, e.g. by screws 9. This part 8 has an opening 10 for the connecting wires 7a and 7b. A cylindrical element 11 is also mounted coaxially of the core 5 to define an annular air-gap E of the stator with the core 5.

A rotor 12 is fastened by suitable means, such as by a shrink-fit, splining, and so forth, at the left-hand end of the driven shaft 2, which extends out of the bore 4 in the magnet core 5. The rotor 12 consists of a first flange-like part 12a, which may or may not be magnetizable, and of a cylindrical ring 12b carried by the flange 12a made of a magnetic highly-permeable material and made either solid or as a sheet-metal packet (the example shown consists of a solid rotor ring). The ring 12b extends into the air-gap E in such a way that the smooth cylindrical surface of the ring 12b is turned toward the axis A, and with the cylindrical surface of the core 5 forms a partial air-gap $e_1$. As shown in FIG. 2, the other cylindrical surface of the ring 12b has tooth-like poles 13, distributed uniformly over the entire periphery of the ring 12b. The poles 13 are advantageously made of the same magnetic permeable material as the ring itself.

In accordance with a first form of construction, an annular metallic band 20, with a smooth surface coaxially surrounds the ring 12b. The width $a$ of this band 20 is less than that the width $b$, of the partial air-gap $e_2$. The band 20 is embedded in a suitable recess in the tips of the poles 13. The relationship $a/(b-a)$ thus corresponds to the relationship between the surface part of the ring circumference, which is covered by the conductive band 20, and the surface having the tooth-like poles 13. Through such an arrangement, any desired relationship may be obtained between the maximum synchronous torque $C_s$ and the asynchronous torque $C_a$ the coupling is to transmit. For this it is sufficient to determine the relationship $a/(b-a)$ and/or the geometric dimensions of the tooth-like poles 13 and/or 17 in any known suitable manner.

Instead of or in addition to the annular band 20 on the rotor ring 12b, an analogous electrically-conductive band 21 may be disposed on the other ring 14b, as shown in FIG. 4. In addition, as shown, the circumferential width $d$ of the teeth 13a of the innermost rotor ring 12b differs from the width $d'$ of the outer ring 14b, although the angular pitch P is the same for both pole-rings.

Referring to FIG. 1, a flange 14a of unmagnetizable material is splined on the end of the driving shaft 1 and faces the driven shaft 2. The flange 14a peripherally carries a cylindrical ring 14b of magnetizable material which is either solid or in the form of a sheet-metal packet. The arrangement is such that the ring 14b with the nonmagnetizable flange 14a represents the driving rotor 14. Both rotor rings 12b and 14b extend concentrically into the air-gap E, so that a partial air-gap $e_2$ is produced therebetween. A small partial air gap $e_3$ also exists between the smooth outer circumference of the ring 14b and the inner flange of the housing part 11.

Referring to FIG. 2, metallic strips 16a, 16b, 16c of high electric conductivity are disposed at regular spacings on the inner cylindrical surface of the ring 14b which delimits the partial air-gap $e_2$ and is directed toward the other ring 12b. These strips 16a, 16b, 16c are also disposed between pole-groups or tooth-groups 17a, 17b, etc. and are made advantageously of the same magnetizable material as the ring 14b. The metallic bands 16a, 16b, etc. and tooth-groups 17a, 17b, etc. have the same central angle $\alpha$ and $\beta$ respectively, although the angles $\alpha$ and $\beta$ may change from group to group. The relationship $\alpha/\beta$, again corresponds to the relationship of the surface parts of the metallic strips or bands to the surface occupied by the tooth-like poles. This relationship may be selected as desired, so as to obtain the desired relationship between the maximum synchronous torque $C_{s\ max}$ and the asynchronous torque $C_a$ which the coupling has to transmit. The metallic bands 16a, 16b, etc. may, for example consist of thin conductive sheet-metal, fastened to the inner rotational surface of the ring 14b by known means. The conductive layer may, however, also be applied by electrolysis. Each tooth-group 17a, 17b, etc. has the same number of teeth 17 — three in the case of FIG. 2. The angular pitch P of these teeth (see also FIG. 4) is the same as that of the teeth 13 of the driven rotor 12.

Referring to FIG. 1, solid conductive rods 18a, 18b are embedded in the gaps between the teeth 17 of each group 17a, 17b, etc. and the ends of the conductive rods of a group 18a, 18b are connected with one another by short-circuit means, such as segments or annular rings 19. The solid conductor rods 18a, 18b, may consist of the same material as the electrically conductive bands 16a, 16b, 16c, or of some other good-conducting material which is metallic. It is not necessary to insulate the rods 18 from the magnetizable metal part of the ring 15. These conductive rods 18, instead of being solid may also be hollow, e.g. made in the form of tubes.

The mode of operation of the magnetic coupling of FIGS. 1 and 2 may be described as follows:

As soon as an electric DC or a rectified AC of suitable current intensity $i$ becomes applied over the connection wires 7a and 7b to the excitation winding 6, a concentric axially-symmetrically magnetic field is induced in the annular air-gap E likewise concentric of the axis A. The magnetic lines of force pass through the air-gap E substantially radially, and the lines of force pass through the three partial air-gaps $e_1$, $e_2$ and $e_3$ and the magnetic rings 12b and 14b, so that they, for example emerge from the tooth-like poles 13 of the first ring and pass into the corresponding poles 17 of the second ring, which at the instant concerned are opposite the poles 13. The magnetic circuit thus becomes closed over the coupling parts 5, 8, 11, 12b and 14b as well as the air-gaps $e_1$, $e_2$ and $e_3$. Depending on the momentary position of the two rotors relative to one another, there is a change of the magnetic resistance (reluctance) of the magnetic circuit. It is clear from FIG. 4 that the magnetic resistance is minimal when the axis of symmetry of the individual teeth of the two rotors match ($\theta = 0$). It is a maximum when the axes of symmetry of the teeth of the one rotor match the half-angle of two opposite teeth of the other rotor ($\theta = \theta_0$), i.e. a position in which the two rotors are in a position of unstable equilibrium, after the passage of the teeth of the first ring from the following teeth of the other ring.

In accordance with the familiar principle, the synchronous method of operating the coupler may be described as follows: For $\theta = 0$ the above-described magnetic circuit has minimal magnetic resistance. When the ring 14b of the driving rotor 14 becomes turned an angle $\theta$ relative to the driven ring 12, the magnetic resistance increases, and the two rings receive a restoring torque $C_s$, as a function of the angle $\theta$ and of the current intensity $i$ in the excitation winding 6 in accordance with one of the curves, shown by way of example in FIG. 3 for four different values of $i$, increasing stepwise from $i_0$ to $i_3$. It can be seen from this that the restoring moment varies depending on the direction of the angle of twist between a positive maximum and a negative minimum, varying from the magnitude $\theta = \pm \theta_{max}$, the form depending on the geometric shape of the poles of the air-gap and of the induced magnetic field strength therein. The restoring force becomes zero again for $\theta = \pm \theta_0$ before a change of direction.

The synchronous torque $C_s$ therefore depends solely on the position of the two rings 12b, 14b relative to one another or to put it more exactly, depends on their teeth 13 and 17 respectively. This torque is quite independent of the speed $n_1 = n_2$ at which the two rotors turn synchronously. The restoring moment exists therefore even during a standstill, and we may regard the moment $C_s$ as a static moment. The point $C_{s\ max}$, with abscissa zero in FIG. 5 ($g = 0$) corresponds to the maximum synchronous restoring moment that the machine can develope for a certain excitation-current intensity. For a given coupling, the magnitude depends only on the tooth geometry and on the magnetic field strength induced in the air-gap. On the other hand, the teeth 13 and 17 of the two rings 12b and 14b, so long as the driving and driven rotors turn synchronously theoretically produce no eddy currents, either in the metallic bands 16a, 16b, etc. or in the annular bands 20, 21, or in the short-circuited conductor rods of the groups 18a, 18b, etc.

In comparison with this, in asynchronous operation Foucault eddy currents are induced in the aforesaid conductive layers or rods as soon as a slip $g = (n_1 - n_2)/n_1$ occurs between the two rotors ($n_1$ and $n_2$ represent the rpm of the driving shaft 1 and of the driven shaft 2). The poles 13 of the driven rotor then run both over the conductive layers 16a, 16b or 21 and also over the solid short-circuited conductive rods 18a, 18b. Analogously with this, the teeth 17 of the driving ring 14b move over the annular band 20 of the driven ring 12b. The induced eddy currents and the magnetic lines of force emerging from the teeth 13 and 17 of the two rings cooperate so that the driven rotor 12 becomes subjected to a so-called "asynchronous" torque $C_a$, which has the tendency to act counter to the physical cause of its creation, i.e. to eliminate the relative turning movement between the two rotors. The driven rotor thus becomes carried along in the same direction of rotation as the driving rotor 14, and the curve $C_a$ of FIG. 5 represents the change of this torque as a function of the slip $g$ between the two rotors for a certain excitation current $i$. Looking in both directions from the zero point (synchronous condition) the asynchronous torque increases up to a certain maximum value, and this depending on the direction or rotation + or − $C_a$ max. In addition, the asynchronous torque slowly decreases, this being caused by various saturation phenomena.

It is known that it is possible to reach the maximum torque $C_{a\ max}$ at a slip $g = 1$ through a suitable choice of both the various constructional elements and also of the excitation current. This value is particularly advantageous in the case of a driving rotor turning at a constant speed $n_1$ which is to be coupled to a stationary ($n_2 = 0$) driven rotor.

In asynchronous operation, both the asynchronous torque $C_a$ and also the synchronous torque $C_s$ act simultaneously on the driven rotor at all times. Their effects therefore become superposed. While the asynchronous torque $C_a$ always pulls in the same direction, i.e. in the direction that the driven rotor 12 is moved or accelerated and in the same direction in which the driving rotor 14 turns, without completely reaching the speed ($n_2 \rightarrow n_1$; $g \rightarrow 0$) of the driving rotor due to losses in the system and to the fact that $-C_a$ decreases with the relative speed of twist, the synchronous torque $C_s$ is pulsating, i.e. the synchronous torque is alternatively driving and then braking, so long as the two rotors run at different speeds, i.e. asynchronously. At each passage of a pole 17 of the driving rotor 14 before a pole 13 of the driven rotor 12, the synchronous torque (per curve $C_{si} = f(i)$ of FIG. 3 for a certain excitation current $i$) passes through a cycle from zero (for $\theta = + \theta_0$) through a positive maximum value $C_{si\ max}$ (for $\theta = + \theta_{max}$) at first in the same direction as the asynchronous moment, and then after a passage through zero (for $\theta = 0$) the torque assumes an equally large maximum value in the opposite direction (lowest point of the curve $-C_{si\ max}$ for $\theta = - \theta_{max}$) and again reaches the value zero for $\theta = -\theta_o$. The curve is repeated in the same direction at the passage of each of the sequent poles.

In asynchronous operation, i.e. so long as the difference between the rotary speeds of the two rotors is great, the sequent positive and negative pulses of the synchronous torque $C_s$ become absorbed and compensated by the flywheel inertia of the driven rotor and the associated masses. Thus the synchronous torque $C_s$ is practically without effect, and only the asynchronous torque $C_a$ is transmitted by the coupling.

In the vicinity of synchronism, i.e. when the rotary speed of the driven rotor 12 approaches that of the driven rotor 14 ($n_2 \rightarrow n_1$; $g \rightarrow 0$), the period of the positive and negative pulses of the torque $C_s$ becomes slowed down, and at a certain instant, the sum of the asynchronous torque $C_a$ and of the positive pulse of the synchronous moment $C_s$ ($+\theta_o > \theta > 0$) is great enough (due to the asynchronous moment $C_a$) to accelerate the driven rotor in the course of the half-period to such an extent that the following negative pulse of $C_s$ is no longer sufficient to retard the driven rotor and this to such an extent that the angle of twist $\theta$ between the two rotors passes back beyond the limit value $-\theta_o$. At this instant, the coupling suddenly switches over from asynchronous to synchronous operation. After a few damped oscillations of the relative angle $\theta$ between the limits $-\theta_o < \theta < +\theta_o$ the angle of twist becomes stabilized at an intermediate value, determined by the load on the coupling. The synchronous torque now solely drives the driven rotor at the synchronous speed $n_1$. The asynchronous torque $C_a$ disappears, because a relative movement between the two rotors no longer exists.

The starting up (i.e. coupling together) and the synchronization may be described as follows by the aid of FIG. 5. In the initial condition, the driving rotor 14 turns at a constant speed $n_1$ while the driven rotor 12 is stationary ($n_2 = 0$) and the slip is $g = (n_1 - n_2)/n_1 = +1$. If an excitation current is now switched on, then the driven rotor 12 is coupled in, and driven by an asynchronous moment $+ C_{a\ max}$ which can be obtained, such as by the aid of suitable choice of the individual structural elements of the coupling. The driven rotor is then accelerated ($n_2$ increases), and the slip g decreases. The operational point follows the curve $C_a$ from right to left as viewed as far as the transition point M with the abcissa $g = +m$. The exact position of the point M is determined as is known by the magnetic flux in the air-gap between the poles by the dimensions of the poles, by the magnetic and electric characteristics of the coupling, by the load-moment, and by the moment of inertia of the driven machine. Those individual magnitudes may thus be suitably chosen to fix the point M. In particular, it is possible through the relationship $\alpha/\beta$ or $a/(b-a)$ between the surfaces with the conductive layers or with the poles, or the parts of the rotor surface adjoining the partial air-gap $e_2$, to vary the location of the point M within wide limits. At point M, the coupling "snaps" (i.e. switches) into synchronous operation, as has already been described, and the two rotors finally turn with the same speed ($n_1 = n_2$; $g = O$). The driving shaft 1 then pulls the driven shaft 2 along with it, and the two rotors maintain a substantially constant angle of twist $\theta$ between the poles of the two rotors. This angle $\theta$ is determined by the magnitude of the torque $C_s$ to be transmitted, or by the driven load to be driven by the coupling.

When for any reason, e.g. when the coupling is installed in the transmission of an automobile, the shaft 2, hitherto termed the "driven shaft", turns more rapidly than the "driving" shaft 1 ($n_2 > n_1$) then the slip g becomes negative. The part of the curve $C_a = f(g)$ situated on the left as viewed is then reached. The functions of the two rotors are then interchanged. That is, the shaft 2 becomes the driving shaft and is held back by the shaft 1 (in synchronous operation) or braked (in asynchronous operation) until the shaft 2 wants to turn faster than the shaft 1. At first, The synchronous type of operation is retained, but the angle of twist $\theta$ between the two rotors becomes negative in order to transmit the restraining moment between 0 and $-C_s$ $_{max}$. The latter value is reached for an angle of twist $\theta =$ $-\theta_{max}$. When the braking moment becomes greater than $-C_{s\ max}$, then the coupling "fades out", i.e. the coupling can no longer continue to run in synchronous operation. When $C_{s\ max}$ has been chosen smaller than $C_{a\ max}$, then the slip g at first assumes the value $g = -m$, and the shaft 1 brakes the shaft 2 with an asynchronous braking moment $-C_a$. If the shaft 2 turns still faster and the braking moment exceeds the allowable value $-C_{a\ max}$, then it is no longer possible to maintain a stable operational state, and the coupling "burns through".

Within certain limits, it is possible to avoid such a "burn through". For example, the number of poles 17 of the ring 14b may be decreased to favor the conductive metal layers 16a, 16b, 16c. That is, the center angle $\alpha$ is made greater (FIG. 2) and/or the width $a$ of the annular band 20 (FIG. 1) is increased.

The present invention is not limited to the forms of construction shown in FIGS. 1 and 2. On the contrary, the invention includes all variants which fall within the scope of protection defined by the claims, and their examples mentioned in the following:

Thus, the opposite rotational surfaces of the driving and driven rotor rings may instead of being cylindrical and disposed concentrically may be disposed in two parallel planes perpendicularly to the axis A of rotation and to the direction of passage of the magnetic field induced by the exciter. In this case, the one ring has uniformly distributed tooth-like poles, and the other has alternate conductive layers and pole-groups. This arrangement falls under the scope of protection of the invention, even when the means inducing the magnetic field or the housing of the coupling have some form other than that described.

Instead of a stationary exciter, it is also possible to provide one that is integral with either the driving or the driven rotor or to have one of the rotors provided with excitation windings which is supplied as is known, e.g. through the intermediary of slip-rings and brushes. It is also possible, as shown in FIG. 2, to interchange the functions of the driving rotor 12 and the driven rotor 14.

The region alternately covered by a conductive layer and having the pole groups may also be located on the driven rotor 12b, while the driving rotor 14b carries tooth-like poles uniformly round its entire circumference. Finally, conductor rods may be disposed between the poles of each group 18a, 18b, etc. instead of massive profiled rods made of tubes, or conductors with some other profile. It is moreover possible to do completely without the conductor rods 18 and limit oneself to the asynchronous moment $C_a$, product mainly through the eddy currents induced in the conductive layers or bands 16, 20, 21. A small portion of the braking force is also contributed by the eddy currents occurring in the magnetizable part of the rotor rings 12b and 14b and their poles 13 and 17.

What is claimed is:

1. An asynchronous synchronizable magnetic coupling for the transmission of a torque, comprising
   means defining a stationary axially-symmetrical air gap between two smooth and parallel rotary-shaped surfaces;
   a driving rotor having a magnetizable ring within said gap and including a smooth surface facing one of said parallel surfaces of said gap;
   a driven rotor coaxially mounted relative to said driving rotor having a magnetizable ring within said gap and having a smooth surface facing the second of said parallel surfaces of said gap and a second surface facing said driving rotor ring surface to define a partial air-gap parallel to said stationary gap;

a means for producing a magnetic field passing through said stationary air gap and said ring surfaces;

a plurality of tooth-like poles on each of said rotor ring surfaces facing each other, said poles being disposed on each ring surface at the same angular spacing, at least one of said ring surfaces having only a fraction thereof provided with projecting poles and gaps between said poles ;and at least one smooth electrically-conductive layer covering the remainder of said one ring surface.

2. A coupling as set forth in claim 1 wherein said means for producing a magnetic field includes at least one excitation winding.

3. A coupling as set forth in claim 1 wherein said rings are annular and are concentrically disposed.

4. A coupling as set forth in claim 1 which further comprises at least one annular electrically conductive band disposed flush on the pole-tops of one of said rotor rings, said band having a transverse width corresponding to a fraction of the axial width of said partial air gap.

5. A coupling as set forth in claim 1 wherein said poles on said one ring surface are distributed in equally spaced apart groups and a smooth electrically-conductive layer axially extending to the full width of the partial gap is disposed between each adjacent pole-groups and is located flush to the pole-tops.

6. A coupling as set forth in claim 5 wherein said layers and said poles define respective surface areas of said one rotor ring in a proportion corresponding to the ratio of the maximum synchronous torque to the asynchronous torque transmitted by the coupling.

7. A coupling as set forth in claim 1 wherein said poles on the other of said rotor rings are distributed uniformly thereon.

8. A coupling as set forth in claim 1 wherein said poles on one rotor ring are of different angular width than said poles on the other rotor ring.

9. A coupling as set forth in claim 1 further comprising a plurality of conductive rods each disposed between an adjacent pair of poles on at least one rotor ring and a pair of short-circuit means connected to said rods at the respective ends of said rods.

10. A coupling as set forth in claim 1 wherein said means defining a stationary air gap includes a magnet core and a cylindrical element; said core and cylindrical element having smooth coaxial surfaces defining said stationary air gap and said rotor rings each having respective smooth coaxial surfaces opposite said core and said cylindrical element to define partial air gaps therebetween.

11. A coupling as set forth in claim 10 wherein said partial air gaps are each of cylindrical shape.

12. A coupling as set forth in claim 10 wherein said means for producing a magnetic field is an excitation winding secured to one of said core and said cylindrical element.

* * * * *